United States Patent [19]

Masclet et al.

[11] 4,189,117
[45] Feb. 19, 1980

[54] RETRACTABLE FUSELAGE MOUNTED UNDERCARRIAGE

[75] Inventors: Jean Masclet, Paris; André Turiot, Morsang-sur-Orge, both of France

[73] Assignee: Messier-Hispano-Bugatti, Montrouge, France

[21] Appl. No.: 882,640

[22] Filed: Mar. 2, 1978

[30] Foreign Application Priority Data

Mar. 8, 1977 [FR] France ............................... 77 06835
Mar. 11, 1977 [FR] France ............................... 77 07393

[51] Int. Cl.² ............................................. B64C 25/12
[52] U.S. Cl. ................................................. 244/102 R
[58] Field of Search ................... 244/100 R, 102, 104

[56] References Cited
U.S. PATENT DOCUMENTS

| | | | |
|---|---|---|---|
| 2,772,060 | 11/1956 | Bendicsen | 244/102 SL |
| 3,038,687 | 6/1962 | Hartel | 244/102 R |
| 3,086,733 | 4/1963 | Hartel | 244/102 R |
| 3,822,048 | 7/1974 | Hartel | 244/104 R |
| 3,951,361 | 4/1976 | Hrusch | 244/102 R |

Primary Examiner—Galen L. Barefoot
Attorney, Agent, or Firm—Scully, Scott, Murphy & Presser

[57] ABSTRACT

A retractable fuselage mounted undercarriage comprising a leg casing mounted to pivot on a main universal joint about an axis which extends longitudinally of the aircraft, the leg casing mounting a wheel assembly which can pivot on the leg casing, a lateral deflection shock absorber and a manoeuvreing and wind bracing jack each connected to the leg casing by a joint and each connected to the fuselage by a joint, the main universal joint being mounted to pivot on the fuselage about an inclined retraction axis which does not pass through the point where the shock absorber is connected to the fuselage, so that, during lowering and retraction of the undercarriage effected by extending or retracting the manoeuvreing and wind bracing jack, the shock absorber acts as a directer bar and orientates the axis of the leg casing, which leg casing is rotated as the main universal joint pivots on the fuselage about the inclined retraction axis.

10 Claims, 5 Drawing Figures

RETRACTABLE FUSELAGE MOUNTED UNDERCARRIAGE

The invention concerns retractable fuselage mounted undercarriages, that is to say undercarriages mounted on the fuselage of an aircraft and housed in the fuselage when retracted.

Fuselage mounted undercarriages are used when it is not possible to mount the undercarriages on the wings of an aircraft either because the wings are too high or too thin or because their geometry is variable. All that would be required to make the retracted wheels of such fuselage mounted undercarriages occupy minimum space would be to arrange the mounting pivots for the undercarriages normal to the plane of symmetry of the aircraft. In the "undercarriage lowered" position, however, the track between the undercarriages would then be too narrow to give the aircraft sufficient stability. This disadvantage has been overcome by judiciously inclining the mounting pivots to the plane of symmetry of the aircraft. However, because of the angle which necessarily exists in the "undercarriage lowered" position between each oblique leg of the undercarriage and the wheel or wheels which it mounts and which are perpendicular to the ground, the result is generally that on retraction the wheels are positioned obliquely within the fuselage, which means that the volume they occupy is undesirably large.

Fuselage mounted undercarriages are already known in which the wheels can be made to occupy a chosen position, e.g. substantially flat, in the "undercarriage retracted" position, so that the volume they occupy complies with certain special conditions, e.g. that it should be of minimum height.

Thus each undercarriage leg can be mounted on a pivot spindle directed obliquely to the longitudinal plane of symmetry of the aircraft and rigidly connected to the fuselage, and, secondly, the wheel or wheels of the undercarriage can be carried by a wheel assembly which can pivot relative to the undercarriage leg. Thus the wheel assembly can pivot about the axis of the leg or of part of the leg or about a substantially longitudinal axis. The wheel assembly can be pivoted in both cases by means of a complex connecting rod assembly, which is connected by a joint to the leg and/or wheel assembly and to the structure of the aircraft, which effects locking of the wheel assembly in its positions relative to the leg, and which has to support heavy strains in operation. Alternatively the wheel assembly can be pivoted by means of hydraulic jacks in addition to the usual manoeuvring jack, these fulfilling the same functions and bearing the same strains as the connecting rod assembly. These methods of solving the problem are however not satisfactory, for the first makes use of an extra anchoring point on the structure of the aircraft, while the second is financially prohibitive since it necessitates using extra hydraulic jacks, appropriately controlled in sequence and always susceptible to breakdown or leakage.

The problem which the invention aims to solve is to provide a retractable fuselage mounted undercarriage where the undercarriage members position themselves in a stowing bay of minimum height in the fuselage, in the "undercarriage retracted" position, without using an additional anchoring point on the structure of the aircraft or employing a jack other than that used to lower and retract the undercarriage.

According to the invention there is provided a retractable fuselage mounted undercarriage comprising a leg casing mounted to pivot on a main universal joint about an axis which extends longitudinally of the aircraft, the leg casing mounting a wheel assembly which can pivot on the leg casing, a lateral deflection shock absorber and a manoeuvring and wind bracing jack each connected to the leg casing by a joint and each connected to the fuselage by a joint, the main universal joint being mounted to pivot on the fuselage about an inclined retraction axis which does not pass through the point where the shock absorber is connected to the fuselage, so that, during lowering and retraction of the undercarriage effected by extending or retracting the manoeuvring and wind bracing jack, the shock absorber acts as a directer bar and orientates the axis of the leg casing, which leg casing is rotated as the main universal joint pivots on the fuselage about the inclined retraction axis.

In one embodiment of the invention, the jack is connected firstly to the fuselage by its piston rod, at a point located on the axis at which the leg casing is connected to the main universal joint, and is connected to the leg casing by its cylinder, by means of a second universal joint, a first rod is connected to the cylinder of the jack, said first rod acting on an external crank, rigidly connected to a pivot which is connected to the leg casing by a joint, and rotating a connecting rod assembly located inside the leg casing and linked with the wheel assembly, so that when the undercarriage is retracted the movement of the leg casing relative to the jack, the cylinder of which has no inherent rotation relative to the leg casing, results in rotation of the external crank controlled by the first rod, and the external crank, acting through the internal connecting rod assembly, causes the wheel assembly to pivot on the leg casing to give the wheel assembly a positioning movement complementary to the movement resulting from the pivoting movement about the axis of retraction.

In this embodiment no jack is involved other than that required to lower and retract the undercarriage, and thus no additional anchoring point on the aircraft structure is needed.

However, when the structure of the aircraft fuselage permits an additional anchoring point in the vicinity of that provided to attach the leg casing, it is advantageous to make use of that opportunity to fix one rod instead of the whole connecting rod assembly, which is otherwise indispensible.

An undercarriage according to a second embodiment of the invention may include a wheel assembly comprising an axle carrying at least one wheel and rigidly connected to a wheel pivot shaft mounted to pivot on the leg casing, about an axis parallel with the axis at which the leg casing is connected to the main universal joint, the wheel pivot shaft carrying a lever, the free end of which is connected by a joint to the lower end of a rod of fixed length which is connected by a joint at its upper end to the fuselage of the aircraft, at a point located neither on the axis of retraction nor on the axis at which the leg casing is connected to the main universal joint, so that when the undercarriage is raised or lowered the rod controls the rocking of the lever of the wheel assembly and the wheel assembly is driven in a complementary positioning movement of the wheel or wheels, which is a movement rocking the plane of the wheel or wheels relative to the axis of the leg casing.

In a particularly interesting embodiment, where the undercarriage is retracted towards the front of the aircraft by the action of the manoeuvreing and wind bracing jack, which is locked in the "rod extended" position to wind brace the undercarriage in the "undercarriage lowered" position, the jack is connected to the fuselage by means of a second universal joint, on which the jack is mounted to pivot about an axis coinciding with the axis at which the leg casing is connected to the main universal joint, the second universal joint being in turn connected to the fuselage.

In this arrangement it is advantageous for the lever, which is carried by the wheel pivot shaft to extend substantially perpendicular to the wheel pivot shaft in a plane parallel with the plane of the wheel or wheels, and is arranged at the rear of the leg casing having regard to orientation of the aircraft, and wherein the point where the rod is connected to the fuselage lies outside the axis of retraction, relative to the longitudinal plane of symmetry of the aircraft, and in a substantially horizontal plane passing through the axis at which the leg casing is connected to the main universal joint.

The invention is diagrammatically illustrated by way of example in the accompanying drawings, in which.

Figure 1:
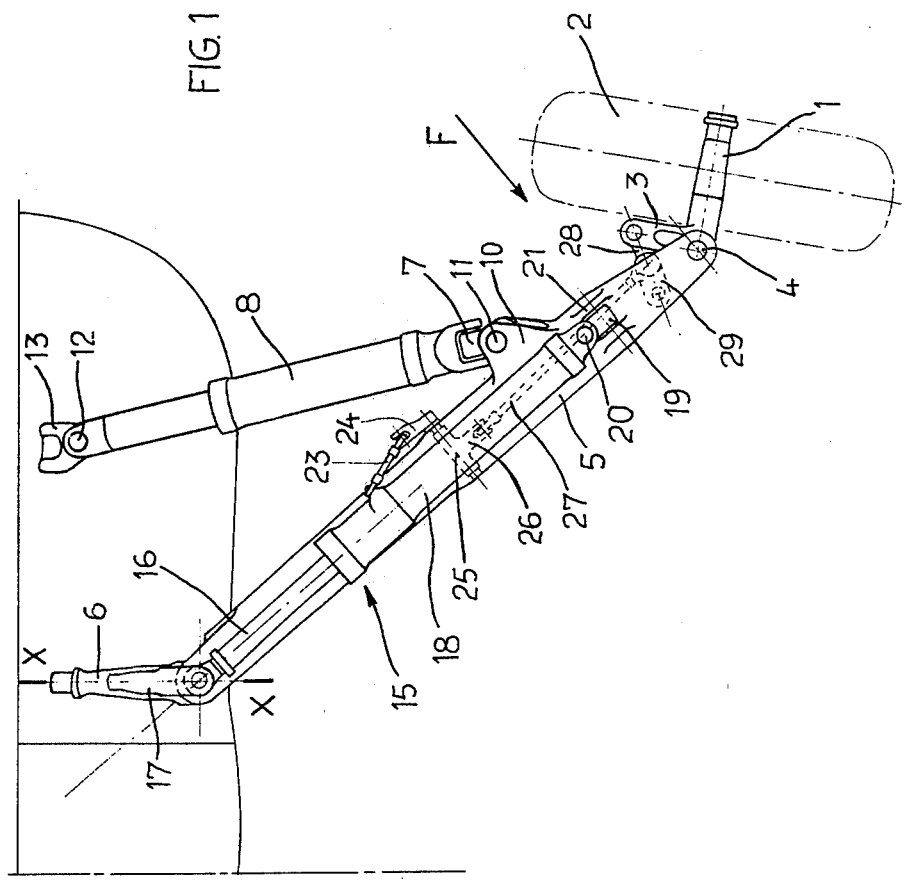
FIG. 1 is a front view of a first embodiment of a left-hand retractable fuselage mounted undercarriage according to the invention in the "undercarriage lowered" position, the right-hand undercarriage being symmetrical therewith.
Figure 2:
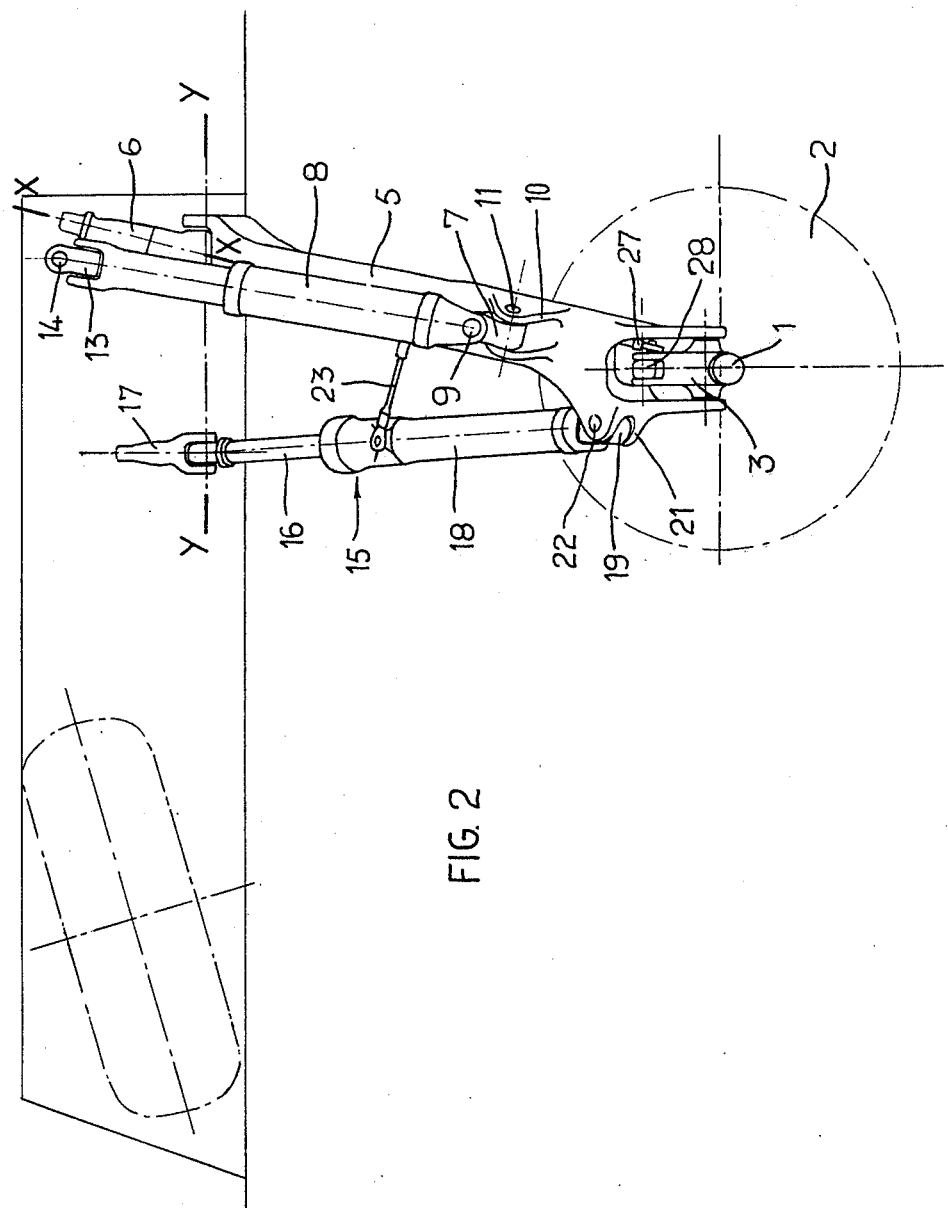
FIG. 2 is a profile view of the undercarriage of FIG. 1, also showing, in dash and dot lines, the position occupied by the wheel in the "undercarriage retracted" position.

Referring firstly to FIGS. 1 and 2, an undercarriage has an axle 1, carrying a wheel 2, the axle 1 forming one arm of a bell-crank lever 3. The bell-crank lever 3 is mounted to pivot about a longitudinally extending spindle 4 at the lower end of a leg casing 5. The upper end of the leg casing 5 is connected to a universal joint 6 about a longitudinally extending geometrical axis YY.

A shock absorber 8 is connected at one of its ends to the leg casing 5 by means of a universal joint 7, on which the shock absorber 8 is mounted so as to pivot about a transverse shaft 9. The universal joint 7 is itself hinged to lugs 10, integral with the leg casing 5, about a shaft 11. The shock absorber 8 is mounted at the other of its ends to pivot about an essentially longitudinally extending shaft 12, of a universal joint 13 which is hinged to the fuselage structure by a transverse shaft 14.

The universal joint 6 is mounted to pivot about a shaft (not shown) linked to the fuselage structure, with its geometrical axis XX inclined downwardly towards the front of the aircraft, and is located in a plane parallel to the longitudinal plane of symmetry of the aircraft. The geometrical axis XX does not pass through the centre of the joint connecting the shock absorber 8 to the fuselage.

The geometrical axis XX thus defines the axis of retraction of the undercarriage, about which the leg casing 5 pivots. The axis of the leg casing 5 is constantly oriented by the shock absorber 8, acting as a directer bar, by the action of a manoeuvreing and wind bracing jack 15, whereas the universal joint 6 rotates the leg casing 5 on itself about an axis. The inclination of the axis XX thus determines the angle of rotation of the leg casing 5 on itself and, in combination with the shock absorber 8, defines the orientation of the leg casing 5 in the "undercarriage retracted" position.

The manoeuvreing and wind bracing jack 15 is connected to the fuselage by its piston rod 16 by means of a universal joint 17. The rod 16 pivots on this joint about a geometrical axis which coincides with the axis YY about which the leg casing 5 is connected to the universal joint 6. The axis YY thus forms the axis of articulation of the loaded undercarriage. The articulated triangle comprising the leg casing 5 and the jack 15 pivots about this axis. The deflections of the articulated triangle under the loads experienced on landing and during taxiing are damped by the shock absorber 8 which is mounted as a shock absorber with lateral deflection.

The universal joint 17 is in turn connected to the fuselage about a vertical axis.

Figure 3:
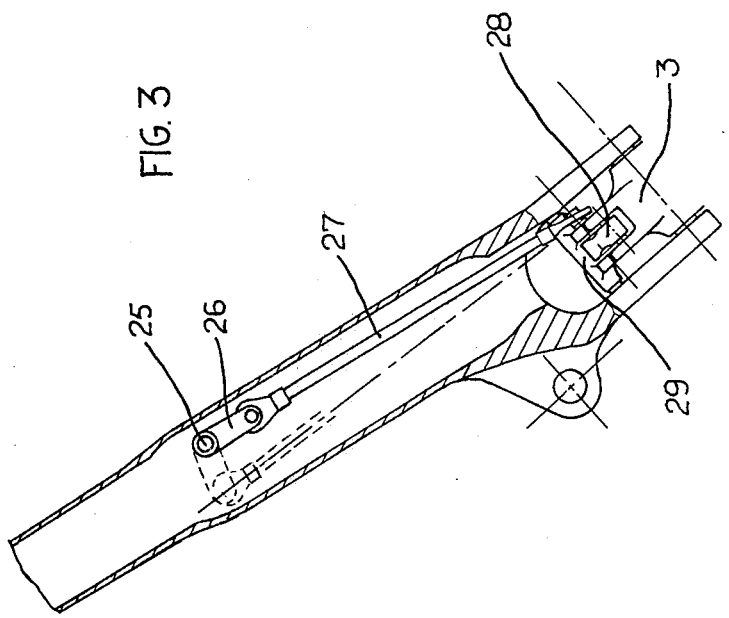
FIG. 3 is a view taken in the direction of the arrow F of FIG. 1, partially in section along the axis of a rod inside the leg casing, showing the arrangement of a connecting rod assembly inside the leg casing and to an increased scale.

The cylinder 18 of the jack 15 is connected to the leg casing 5 by means of a universal joint 19, similarly to the shock absorber 8, being mounted to pivot on the joint about a longitudinally extending spindle 20. The joint 19 is hinged by a spindle 22 to lugs 21 integral with the leg casing 5. Also hinged to the cylinder 18 of the jack 15 is a first rod 23, the other end of which is connected to the end of an external crank 24. The crank 24 is connected for rotation with a sleeve 25 (FIGS. 1 and 3) which is mounted to pivot inside the leg casing 5, about a spindle extending transversely to the leg casing 5. A second crank 26, connected for rotation with the sleeve 25 within the leg casing 5, is hinged to one end of a second rod 27. The rod 27 is also located inside the leg casing 5, with its other end connected to the joint between a first link 28 and a second link 29. The first link 28 is connected to the free end of the other arm of the bell-crank lever 3 and the second link 29 is mounted to pivot on the leg casing 5 about a longitudinally extending axis and is preferably in the form of a double fastening member rigidly connected to a shaft which is mounted so as to pivot on the leg casing 5.

The manoeuvreing and wind bracing jack 5 is a hydraulic jack of a kind well known in the undercarriage field, comprising an internal arrangement for locking it in the "rod extended" position and possibly a similar arrangement for locking in the "rod retracted" position.

In the example more particularly described, where the aim is to house the undercarriage in a stowage bay of minimum heights in the "undercarriage retracted" position, the axis YY and the axis 4 on which the bell-crank lever 3 is connected to the leg casing 5 are horizontal and parallel with the longitudinal axis of the aircraft, while the axis XX is located in a plane parallel with the longitudinal plane of symmetry of the aircraft.

The undercarriage just described operates as follows:

In the "undercarriage lowered" position, shown in continuous lines in FIGS. 1 and 2, the manoeuvreing and wind bracing jack 15 is locked in the "rod extended" position and acts as a brace for the leg of the undercarriage thus locked in the "undercarriage lowered" position. The jack 15 simultaneously brings about angular locking of the wheel assembly, comprising the wheel 20 carried by the axle 1, the bell-crank lever 3 and the first link 28; it does this by means of the first rod 23 carried by its cylinder 18 and by the external crank 24 and the internal connecting rod assembly, comprising the internal crank 26, the second rod 27 and the second link 29. In the "undercarriage lowered" position the angular locking of the movable equipment is brought about by aligning the first link 28 with the second link 29, this first alignment being controlled by the alignment of the second rod 27 with the internal crank 26.

Given that the axis YY is horizontal and parallel with the longitudinal axis of the aircraft, the leg casing 5 is deflected virtually within the vertical plane in which it lies, during operation of the shock absorber 8, so that the plane of the wheel 2 remains parallel with the longitudinal axis of the aircraft. Due to the inclination of the leg casing 5, the track of the undercarriage increases when the shock absorber is compressed, thus contributing towards the damping of energy on landing, by sideways scuffing of the tires, and also towards improvement in the stability of the aircraft in its movements on the ground.

The undercarriage is raised towards the front of the aircraft. For this purpose the jack 15, located on the front of the leg casing 5, is unlocked and the rod 16 is pulled into the cylinder 18.

Owing to the shortening of the jack 15 the leg casing 5 and thus the wheel assembly carried by it pivot about the raising axis XX and are guided, during that movement, by the shock absorber 8 acting as a director bar. The universal joint 6 simultaneously drives the leg casing 5 in a rotation on itself; as already stated, this rotation is defined by the arrangement of the axes of pivoting of the main universal joint 6.

Since the cylinder 18 of the jack 15 is connected to the leg casing 5 by the universal joint 19, there is no actual rotation of the cylinder 18 relative to the leg casing 5 during the raising operation. On the other hand, the movement of the leg casing 5 relative to the jack 15, in this example a drawing-together movement, controls a rotary movement of the external crank 24 and sleeve 25 relative to the leg casing 5, caused by the first rod 23. This rotary movement takes place simultaneously with the rotation of the leg casing 5 about the axis of retraction XX and simultaneously with its rotation on itself. The sleeve 25 in turn rotates the wheel assembly, by means of the internal connecting rod assembly, since rotation of the sleeve 25 brings the internal crank 26 out of alignment with the second rod 27. This is followed by rotation of the inner crank 26 and traction on the second rod 27 (dash and dot lines in FIG. 3). The traction on the rod 27 controls the disalignment of the first and second links 28 and 29, followed by rotation of the link 29 relative to the leg casing 5 and traction by the link 28 on the end of the bell-crank lever 3, which is thus rotated about the shaft 4. The movement of the jack 15 and leg casing 5 towards one another is thus converted by the connecting rod assembly into a rotary movement of the wheel assembly about the shaft 4, with respect to the leg casing 5. There is therefore a rocking of the plane of the wheel 2 which tends to become parallel with the axis of the leg casing 5; the rocking constitutes a positioning movement of the wheel 2 which is complementary to the movement resulting from the manoeuvring about the axis of retraction XX. In the example shown in FIGS. 1 and 2, the rocking of the plane of the wheel 2 towards the axis of the leg casing 5 is through about 30°, simultaneously with rotation of the wheel 2 through about 90° towards the front of the leg casing 5, when the latter is rotated on itself by the universal joint 6 during the raising process, the wheel 2 positioning itself substantially flat within the fuselage in the "undercarriage retracted" position.

The undercarriage thus described has the advantage of having good rigidity because of its "tripod" structure, due to the use of the three bars forming the leg casing 5, the jack 15 and the shock absorber 8. In addition, the locking of the connecting rod assembly by double alignment eliminates problems which may be created by deformation of the various components of the undercarriage, without resorting to a set of resilient rods and abutments.

The choice of a horizontal axis YY prevents nipping of the wheel during normal operation and, in the event of a component of the connecting rod assembly being fractured, keeps the axle perpendicular to the trajectory, the wheel coming into abutment with the leg casing and continuing to carry out its function.

Figure 4:
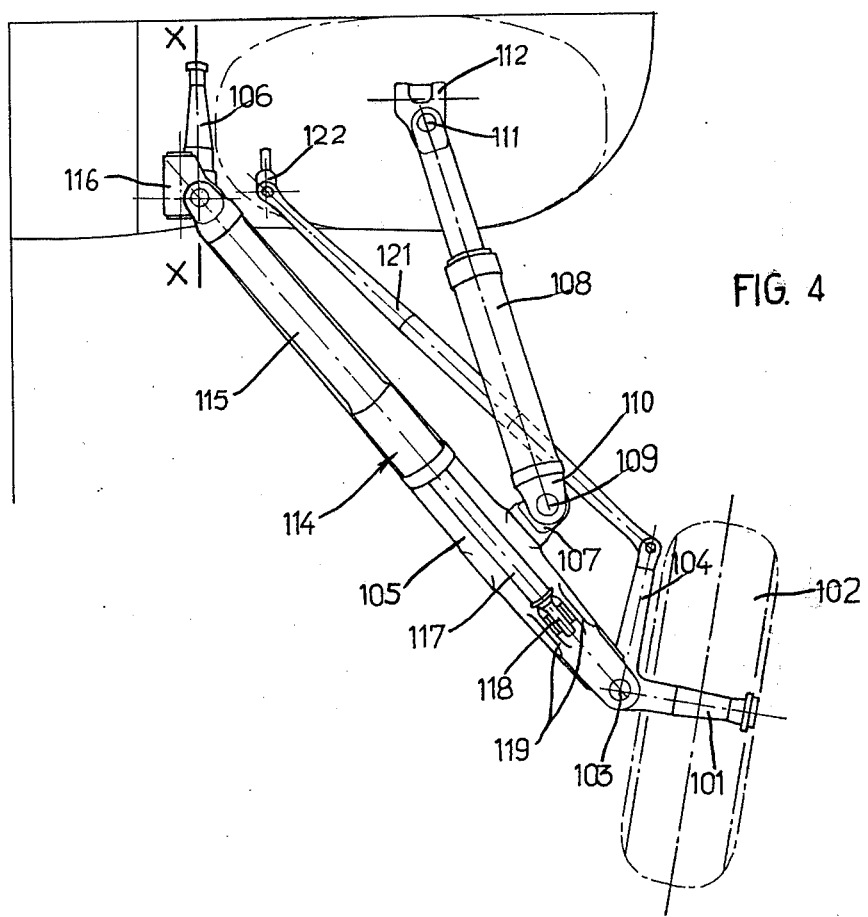
FIG. 4 is a front view of a second embodiment of a left-hand retractable fuselage mounted undercarriage according to the invention in the lowered position.
Figure 5:
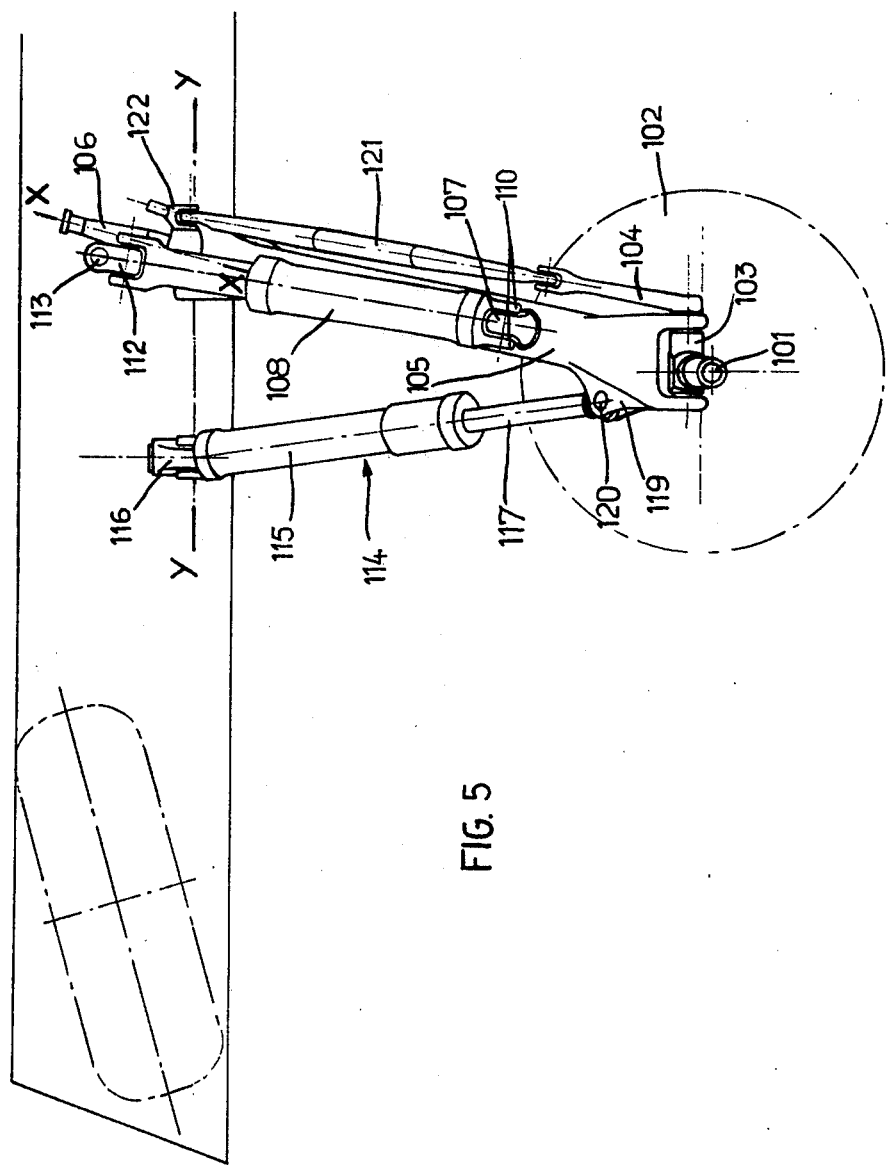
FIG. 5 is a profile view of the undercarriage of FIG. 4.

Referring now to FIGS. 4 and 5, the undercarriage shown has an axle 101 carrying a wheel 102 and rigidly connected to a shaft 103 which is mounted so as to pivot on the lower part of a leg casing 105. The rear end of the shaft 103 is rigidly connected to a lever 104 which is substantially perpendicular to the shaft 103 and located in a plane parallel with the plane of the wheel 102. The axle 101, shaft 103 and lever 104 thus effectively form a rigid bell-crank lever. The upper end of the leg casing 105 is connected to a universal joint 106 about a longitudinal geometrical axis YY. A shock absorber 108 is connected firstly to the leg casing 105 by means of a pivot 107. The shock absorber 108 is mounted on this so as to pivot about a longitudinal spindle 109 by means of a fastening member 110. The pivot 107 is in turn mounted so as to pivot on the leg casing 105 about a spindle extending transversely to the leg casing. The shock absorber 108 is further mounted so as to pivot on a universal joint 112 about an essentially longitudinal spindle 111, the joint 112 itself being connected to the fuselage structure about a transverse spindle 113.

The universal joint 106 is mounted so as to pivot about a spindle (not shown) which is linked with the fuselage structure and the geometrical axis XX of which is inclined downwardly towards the front of the aircraft. It is located in a plane parallel with the longitudinal plane of symmetry of the aircraft. In addition, the geometrical axis XX does not pass through the centre of the joint connecting the shock absorber 108 to the fuselage.

The geometrical axis XX thus defines the axis of retraction of the undercarriage, about which the leg casing 105 pivots. The axis of the leg casing 105 is constantly oriented by the shock absorber 8 acting as a director bar, by the action of a manoeuvring and wind bracing jack 114, whereas the main universal joint 106 rotates the leg casing 105 on itself about its axis. The inclination of the axis XX thus determines the angle of rotation of the leg casing on itself and, in co-operation with the shock absorber 108, defines the orientation of the leg casing 105 in the "undercarriage retracted" position.

The manoeuvring and wind bracing jack 114 has its cylinder 115 connected to the fuselage by a universal joint 116, on which the cylinder 115 pivots about a geometrical axis coinciding with the axis YY of articulation of the leg casing 105 to the main universal joint 106. The axis YY thus constitutes the axis of articulation of the landing gear under load, and the articulated triangle formed by the leg casing 105 and the jack 114 pivots around this axis. The deflections of the articulated triangle under the loads experienced on landing and taxiing are damped by the shock absorber 108 which is mounted as a shock absorber with lateral deflection. The universal joint 116 is in turn hinged to the fuselage about a vertical axis.

The rod 117 of the jack 114 is connected to the leg casing 105 by means of a knee joint connector 118 which is held in lugs 119, integral with the leg casing 105, by a spindle 120.

Finally, a rod of fixed length 121 is connected by its lower end to the free end of the lever 104, which is shaped to form spaced lugs, and is connected by its upper end, to the fuselage at a point outside the axis of retraction, relative to the median plane of the aircraft, and in a substantially horizontal plane passing through the connection between the leg casing 105 and the main universal joint 106. The connection between the rod 121 and the fuselage may be provided by a universal joint 122, with the rod 121 pivoting on it about an axis parallel with the axis YY, the universal joint 122 pivoting on the fuselage about an inclined axis substantially parallel with the axis of retraction XX.

The axis YY and the axis about which the shaft 103 pivots on the leg casing 105 are here again chosen to be horizontal and parallel to the longitudinal axis of the aircraft, as the axis XX is in a plane parallel with the longitudinal plane of symmetry of the aircraft.

The undercarriage of FIGS. 4 and 5 operates as follows:

In the "undercarriage lowered" position, shown in continuous lines in FIGS. 4 and 5, the jack 114 is locked in the "rod extended" position and acts as a brace for the leg casing 105, which is thus locked in the "undercarriage lowered" position. The rod 121 simultaneously carries out angular locking of the wheel assembly, comprising the wheel 102 carried by the axle 101, the shaft 103 and the lever 104.

Given that the axis YY is horizontal and parallel with the longitudinal axis of the aircraft, the leg casing 105 is deflected virtually within the vertical plane in which it lies during operation of the shock absorber 8, so that the plane of the wheel 2 remains parallel with the longitudinal axis of the aircraft. Owing to the inclination of the leg casing 105, the track of the undercarriage is increased when the shock absorber is compressed. This contributes towards damping the energy on landing, by sideways scuffing of the tires, and also towards improving the stability of the aircraft in movements on the ground.

The undercarriage is raised towards the front of the aircraft. For this purpose the jack 114, which is located on the front of the case 105, is unlocked and its rod 117 is pulled into its cylinder 115.

As a result of the shortening of the jack 114, the leg casing 105 and thus the wheel assembly carried by its pivot about the raising axis XX. During this movement they are guided by the shock absorber 18 acting as a directer bar. The universal joint 106 simultaneously causes the leg casing 105 to rotate on itself. As already mentioned, this rotation is defined by the arrangement of the axes of pivoting of the main universal joint 106.

During the raising process, since the point at which the rod 121 is fixed to the fuselage is not on the axis of retraction XX, the lever 104 is rocked. The wheel assembly is consequently driven in a rocking motion defined by pivoting of the shaft 103 with respect to the leg casing simultaneously with rotation of the leg casing 105 about the axis of retraction XX and its rotation on itself. There is thus a rocking of the plane of the wheel 102, which tends to become parallel with the axis of the leg casing 105; this rocking constitutes a movement for positioning the wheel 102, complementary with the movement resulting from manoeuvreing about the axis of retraction XX. In the example shown in FIGS. 4 and 5, the rocking of the plane of the wheel 102 towards the axis of the leg casing 105 is approximately 30°. This occurs simultaneously with rotation of the wheel 102 through about 90° towards the front of the leg casing 105, when the latter is rotated on itself by the universal joint 106 during the raising process. The wheel 102 is positioned substantially flat within the fuselage, in the "undercarriage retracted" position.

The undercarriage thus described has excellent rigidity due to "tripod structure". This is improved by the presence of the rod 121 assisting the leg casing 105 in its functions.

The choice of a horizontal axis YY makes it possible to avoid nipping the wheel during normal operation and, in the event of the rod 121 being fractured, ensures that the axle 101 remains perpendicular to the trajectory, the wheel butting against the leg casing and continuing to carry out its functions.

Finally, the choice of adjustment of the axis XX in the undercarriage makes it possible to minimise the angle through which the plane of the wheel rocks towards the axis of the leg casing.

The embodiments described can obviously be modified in many ways without thereby departing from the scope of the invention as defined by the appended claims.

For example, the axle 1 or 101 may be common to two wheels mounted side by side in a diabolo arrangement. The universal joints used to connect the shock absorber to the fuselage and the leg casing and the cylinder of the jack to the fuselage may be replaced by appropriate knee joints.

Finally, the invention equally concerns undercarriages which are retracted forwards or backwards and controlled by extension or retraction of the rod of the jack within the cylinder, the jack being fixed to the fuselage either in front of or behind the leg casing.

What is claimed is:

1. A retractable fuselage mounted undercarriage for an aircraft comprising a leg casing mounted to pivot on a main universal joint about an axis which extends longitudinally of the aircraft, said leg casing mounting a wheel assembly which can pivot on said leg casing, a lateral deflection shock absorber and a manoeuvreing and wind bracing jack each connected to said leg casing by a joint and each connected to the fuselage of the aircraft by a joint, said main universal joint being mounted to pivot on said fuselage about an inclined retraction axis which does not pass through said joint which connects said shock absorber to said fuselage, so that, during lowering and retraction of the undercarriage effected by adjusting the length of said manoeuvreing and wind bracing jack, said shock absorber acts as a directer bar and orientates the axis of said leg casing, which leg casing is rotated as said main universal joint pivots on said fuselage about said inclined retraction axis.

2. The invention claimed in claim 1, wherein said wheel assembly comprises an axle carrying a wheel and rigidly connected to a wheel pivot shaft mounted to pivot on said leg casing, about an axis parallel with said axis at which said leg casing is connected to said main universal joint, said wheel pivot carrying a lever, the free end of which lever is connected by a joint to the lower end of a rod of fixed length which is connected by a joint at its upper end to said fuselage of the aircraft, at a point located neither on said axis of retraction nor on said axis at which said leg casing is connected to said main universal joint, so that, during raising and lowering movement of said undercarriage, said rod controls the rocking of said lever of said wheel assembly and said wheel assembly is driven in a complementary positioning movement of said wheel, which is a movement rocking the plane of the wheel relative to said axis of said leg casing.

3. The invention claimed in claim 2, wherein retraction takes place towards the front of the aircraft by the action of said jack which is lockable in the "rod extended" position to wind brace said undercarriage in the "undercarriage lowered" position, said jack being connected to said fuselage by a second universal joint on which said jack is mounted to pivot about an axis which coincides with said axis at which said leg casing is connected to said main universal joint, said second universal joint being itself connected to said fuselage.

4. A retractable fuselage mounted undercarriage for an aircraft comprising a leg casing mounted to pivot on a main universal joint about an axis which extends longitudinally of the aircraft, said leg casing mounting a wheel assembly which can pivot on said leg casing, a lateral deflection shock absorber and a manoeuvreing and wind bracing jack each connected to said leg casing by a joint and each connected to the fuselage of the aircraft by a joint, said main universal joint being mounted to pivot on said fuselage about an inclined retraction axis which does not pass through said joint which connects said shock absorber to said fuselage, so that, during lowering and retraction of the undercarriage effected by adjusting the length of said manoeuvreing and wind bracing jack, said shock absorber acts as a directer bar and orientates the axis of said leg casing, which leg casing is rotated as said main universal joint pivots on said fuselage about said inclined retraction axis, said jack has a piston rod and a cylinder, is connected to said fuselage by said piston rod, at a point located on said axis at which said leg casing is connected to said main universal joint, and is connected to said leg casing by said cylinder, by means of a second universal joint, a first rod is connected to said cylinder, said first rod acting on an external crank pivoted on said leg casing, rotating a connecting rod assembly located inside said leg casing and linked with said wheel assembly, so that when said undercarriage is retracted the movement of said leg casing relative to said jack, said cylinder of which has no inherent rotation relative to said leg casing, results in rotation of said external crank by said first rod, and said external crank, acting through said internal connecting rod assembly, causes said wheel assembly to pivot on said leg casing to give said wheel assembly a positioning movement complementary to the movement resulting from the pivoting movement about said axis of retraction.

5. The invention claimed in claim 4, wherein said wheel assembly comprises an axle carrying a wheel and forming one arm of a bell-crank lever mounted to pivot on said leg casing about a pivot axis parallel with said axis at which said leg casing is connected to said main universal joint, the other arm of said bell-crank lever being connected to a first link of said connecting rod assembly inside said leg casing, so that the complementary positioning movement is a movement rocking the plane of said wheel relative to said leg casing.

6. The invention claimed in claim 5, wherein said connecting rod assembly inside said leg casing comprises an internal crank, rigidly connected to said external crank and connected to a second rod which acts on a connection between said first link and a second link, mounted to pivot in said leg casing, so that rotation of said external crank leads, through rotation of said internal crank and traction on said second rod, to rotation of said second link and, through traction on said first link, to rotation of said bell-crank lever.

7. The invention claimed in claim 6, wherein angular locking of said wheel assembly about said pivot axis on said leg casing in the "undercarriage lowered" position, is obtained by a first alignment of said first and said second links, controlled by a second alignment of said second rod and said internal crank within said leg casing.

8. The invention claimed in claim 4, wherein said piston rod of said jack is connected to a third universal joint about an axis which coincides with said axis at which said leg casing is connected to said main universal joint, and wherein said third universal joint is itself connected to said fuselage about a vertical axis.

9. A retractable fuselage mounted undercarriage for an aircraft comprising a leg casing mounted to pivot on a main universal joint about an axis which extends longitudinally of the aircraft, said leg casing mounting a wheel assembly which can pivot on said leg casing, a lateral deflection shock absorber and a manoeuvreing and wind bracing jack each connected to said leg casing by a joint and each connected to the fuselage of the aircraft by a joint, said main universal joint being mounted to pivot on said fuselage about an inclined retraction axis which does not pass through said joint which connects said shock absorber to said fuselage, so that, during lowering and retraction of the undercarriage effected by adjusting the length of said manoeuvreing and wind bracing jack, said shock absorber acts as a directer bar and orientates the axis of said leg casing, which leg casing is rotated as said main universal joint pivots on said fuselage about said inclined retraction axis, said wheel assembly comprises an axle carrying a wheel and rigidly connected to a wheel pivot shaft mounted to pivot on said leg casing, about an axis parallel with said axis at which said leg casing is connected to said main universal joint, said wheel pivot shaft carrying a lever, the free end of which lever is connected by a joint to the lower end of a rod of fixed length which is connected by a joint at its upper end to said fuselage of the aircraft, at a point located neither on said axis of retraction nor on said axis at which said leg casing is connected to said main universal joint, so that, during raising and lowering movement of said undercarriage, said rod controls the rocking of said lever of said wheel assembly and said wheel assembly is driven in a complementary positioning movement of said wheel, which is a movement rocking the plane of the wheel relative to said axis of said leg casing, said lever carried by said wheel pivot shaft extends substantially perpendicular to said wheel pivot shaft in a plane parallel with the plane of said wheel and is arranged at the rear of said leg casing having regard to orientation of said aircraft, and wherein the point where said rod is connected to said fuselage lies outside said axis of retraction, relative to the longitudinal plane of symmetry of said aircraft, and in a substantially horizontal plane passing through said axis at which said leg casing is connected to said main universal joint, and further wherein retraction takes place towards the front of the aircraft by the action of said jack which is lockable in the "rod extended" position to wind brace said undercarriage in the "undercarriage lowered" position, said jack being connected to said fuselage by a second universal joint on which said jack is mounted to pivot about an axis which coincides with said axis at which said leg casing is connected to said main universal joint, said second universal joint being itself connected to said fuselage.

10. A retractable fuselage mounted undercarriage for an aircraft comprising a leg casing mounted to pivot on a main universal joint about an axis which extends longitudinally of the aircraft, said leg casing mounting a wheel assembly which can pivot on said leg casing, a lateral deflection shock absorber and a manoevreing and wind bracing jack each connected to said leg casing by a joint and each connected to the fuselage of the aircraft by a joint, said main universal joint being mounted to pivot on said fuselage about an inclined retraction axis which does not pass through said joint which connects said shock absorber to said fuselage, so that, during lowering and retraction of the undercarriage effected by adjusting the length of said manoeuvreing and wind bracing jack, said shock absorber acts as a directer bar and orientates the axis of said leg casing, which leg casing is rotated as said main universal joint pivots on said fuselage about said inclined retraction axis, said axis of retraction is inclined downwardly towards the front of said aircraft, in a plane parallel with the longitudinal plane of symmetry of said aircraft, and wherein said axis at which said leg casing is connected to said main universal joint and said axis about which said wheel assembly pivots on said leg casing are parallel with said longitudinal axis of said aircraft.

* * * * *